United States Patent
Zhang

(10) Patent No.: US 9,841,242 B2
(45) Date of Patent: Dec. 12, 2017

(54) METHOD OF AIR PREHEATING FOR COMBUSTION POWER PLANT AND SYSTEMS COMPRISING THE SAME

(71) Applicant: ALSTOM Technology Ltd, Baden (CH)

(72) Inventor: Wei Zhang, South Windsor, CT (US)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 921 days.

(21) Appl. No.: 13/923,936

(22) Filed: Jun. 21, 2013

(65) Prior Publication Data

US 2014/0374053 A1 Dec. 25, 2014

(51) Int. Cl.
*F28D 19/04* (2006.01)
*F23L 15/02* (2006.01)

(52) U.S. Cl.
CPC .............. *F28D 19/04* (2013.01); *F23L 15/02* (2013.01); *F28D 19/041* (2013.01); *F28D 19/047* (2013.01); *F23C 2900/99008* (2013.01); *Y02E 20/346* (2013.01); *Y02E 20/348* (2013.01)

(58) Field of Classification Search
CPC ...... F28D 19/04; F28D 19/041; F28D 19/047; F23L 15/02; F23C 2900/99008; Y02E 20/346
See application file for complete search history.

(56) References Cited

U.S. PATENT DOCUMENTS

| | | | | |
|---|---|---|---|---|
| 3,229,753 A | * | 1/1966 | Koch | F23L 15/02 165/7 |
| 3,780,498 A | * | 12/1973 | Wenner | B01D 53/06 165/7 |
| 4,062,129 A | * | 12/1977 | Yoshida | B01D 53/26 165/8 |
| 4,114,680 A | * | 9/1978 | Kritzler | F28D 17/023 165/4 |
| 4,678,643 A | * | 7/1987 | Fetzer | B01D 53/8625 165/8 |
| 5,145,652 A | * | 9/1992 | Veser | B01D 53/8631 165/8 |
| 5,397,548 A | * | 3/1995 | Kritzler | B01D 53/8631 165/5 |

(Continued)

FOREIGN PATENT DOCUMENTS

| | | |
|---|---|---|
| CN | 1336846 A | 2/2002 |
| CN | 1924506 A | 3/2007 |

(Continued)

*Primary Examiner* — Steven B McAllister
*Assistant Examiner* — Steven Anderson, II
(74) *Attorney, Agent, or Firm* — GE Global Patent Operation; Stephen G. Midgley

(57) ABSTRACT

Disclosed herein is a heat exchanger for transferring heat between a first gas flow and a second gas flow, the heat exchanger comprising at least two sectors; a first sector that is operative to receive a combustion air stream; and a second sector that is opposed to the first sector and that is operative to receive either a reducer gas stream or an oxidizer gas stream, and a pressurized layer disposed between the first sector and the second sector; where the pressurized layer is at a higher pressure than combustion air stream, the reducer gas stream and the oxidizer gas stream.

16 Claims, 14 Drawing Sheets

(56) References Cited

U.S. PATENT DOCUMENTS

| | | | |
|---|---|---|---|
| 5,915,340 A * | 6/1999 | Cronin | F28D 19/047 122/1 A |
| 6,085,829 A * | 7/2000 | Neuhaus | F23L 15/02 165/8 |
| 7,082,987 B2 * | 8/2006 | Hamilton | F28D 19/047 165/10 |
| 7,824,574 B2 * | 11/2010 | White | B01J 23/002 252/373 |
| 8,807,991 B2 * | 8/2014 | McDonald | F23L 15/02 110/302 |
| 2001/0035280 A1 * | 11/2001 | Okano | F28D 19/041 165/8 |
| 2004/0237404 A1 | 12/2004 | Andrus, Jr. et al. | |
| 2007/0269759 A1 * | 11/2007 | Lee | F23G 7/068 432/72 |
| 2009/0020405 A1 * | 1/2009 | Fan | B01J 19/00 201/12 |
| 2010/0163208 A1 | 7/2010 | Raths | |
| 2010/0243198 A1 | 9/2010 | Slocum | |
| 2010/0289223 A1 * | 11/2010 | Birmingham | F28D 19/041 277/306 |
| 2014/0170572 A1 * | 6/2014 | Muller-Odenwald | F23C 9/00 431/11 |

FOREIGN PATENT DOCUMENTS

| | | |
|---|---|---|
| CN | 101080606 A | 11/2007 |
| CN | 102575907 A | 7/2012 |
| EP | 1874437 A1 | 1/2008 |
| EP | 2 583 938 A1 | 4/2013 |
| JP | S6488024 A | 4/1989 |
| JP | 2001355979 A | 12/2001 |
| JP | 2003-083689 A | 3/2003 |
| JP | 2011220667 A | 11/2011 |
| WO | 2004/111563 A1 | 12/2004 |
| WO | 2011/037789 A1 | 3/2011 |

* cited by examiner

METHOD OF AIR PREHEATING FOR COMBUSTION POWER PLANT AND SYSTEMS COMPRISING THE SAME

STATEMENT REGARDING FEDERALLY SPONSORED RESEARCH OR DEVELOPMENT

The subject matter of the present invention was developed under a research contract with the U.S. Department of Energy (DOE), Contract No. DE-FE0009484. The government of the United States has certain rights in the invention.

TECHNICAL FIELD

This disclosure relates to a method of air preheating for combustion power plants and to systems that enable air preheating in a combustion power plant. This disclosure also relates to a chemical looping facility that includes the systems that enable air preheating in a combustion power plant.

BACKGROUND

Chemical looping is a recently developed process which can be utilized in electrical power generation plants which burn fuels such as coal, biomass, and other fuels. The chemical looping process can be implemented in existing or new power plants, and provides promising improvements in terms of reduced plant size, reduced emissions, and increased plant operational efficiency, among other benefits.

The FIG. 1 depicts a chemical looping system 2 that comprises an oxidizer 4 and a reducer 6. In the oxidizer 4, a solid oxygen carrier such as calcium sulfide (CaS) or a metal (denoted as "Me") are oxidized with oxygen derived from air. For example, calcium sulfide is oxidized in the oxidizer 4 to calcium sulfate. The oxygen depleted air, containing primarily nitrogen, small amounts of oxygen and other gas species, is released from the oxidizer as exhaust. The calcium sulfate is then transported to a reducer 6, where calcium sulfate is reduced to calcium sulfide with the release of oxygen. The released oxygen is used to combust a fuel supplied to the reducer 6. The combustion of the fuel in the reducer 6 produces primarily carbon dioxide, small amounts of water and other gas species (exhaust gases). The reduced calcium sulfide from the reducer is discharged to the oxidizer 4.

In summary, a chemical looping system utilizes a high temperature process, whereby solids such as calcium- or metal-based compounds are "looped" between a first reactor, called an oxidizer (or an air reactor), and a second reactor, called a reducer (or a fuel reactor). In the oxidizer, oxygen from air injected into the oxidizer is captured by the solids in an oxidation reaction. The captured oxygen is then carried by the oxidized solids to the reducer to be used for combustion and/or gasification of a fuel such as coal, for example. After a reduction reaction in the reducer, the solids, no longer having the captured oxygen, are returned to the oxidizer to be oxidized again. This cycle is repeated.

In the chemical looping system, the gas leaving the oxidizer comprises primarily nitrogen with small amounts of oxygen and other gas species, and the gas leaving the reducer comprises primarily carbon dioxide with small amounts of water and other gas species. The exhaust gas from the oxidizer is vented into the air after its heat energy is utilized. The exhaust gas from the reducer is sent to a gas processing unit for further clean up and finally becomes high purity carbon dioxide.

Since the oxidizer is fluidized with air and the reducer is fluidized with recirculated high concentration carbon dioxide, it is desirable to preheat the air with recovery heat from both exhaust gas streams. An air preheater is used to preheat the air supplied to the oxidizer with heat obtained from the exhaust gas streams.

There are different types of air preheaters. Plate and tubular type air preheaters do not have leakage between the air side and the gas side but are normally used in smaller applications due to their low heat recovery efficiency. The rotary regenerative type air preheaters, with their high heat recovery efficiency, are used dominantly in utility scale power plants. However, leakage in such rotary regenerative air preheaters is inevitable. Special design measures are required to minimize the leakage.

FIGS. 2A and 2B generally depict a conventional air preheater 10, and more particularly, a rotary regenerative air preheater 10. The air preheater 10 has a rotor 12 rotatably mounted in a housing 14. The rotor 12 includes partitions 16 extending radially outward from a rotor post 18 toward an outer periphery of the rotor 12. The partitions 16 define compartments 20 therebetween for containing heat exchange element basket assemblies 22. Each heat exchange basket assembly 22 has a predetermined effective heat transfer area (typically on the order of several thousand square feet) of specially formed sheets of heat transfer surfaces, commonly referred to as heat exchange elements 42.

In the conventional rotary regenerative air preheater 10, a flue gas stream 28 and a combustion air stream 34 enter the rotor 12 from respective opposite sides thereof, and pass in substantially opposite directions over the heat exchange elements 42 housed within the heat exchange element basket assemblies 22. More particularly, a cold air inlet 30 and a cooled flue gas outlet 26 are disposed at a first side of the heat exchanger (generally referred to as a cold end 44), while a hot flue gas inlet 24 and a heated air outlet 32 are disposed at a second side, opposite the first side, of the air preheater 10 (generally referred to as a hot end 46). Sector plates 36 extend across the housing 14 adjacent to upper and lower faces of the rotor 12. The sector plates 36 divide the air preheater 10 into an air sector 38 and a flue gas sector 40.

The arrows shown in FIGS. 2A and 2B indicate a direction of travel of the flue gas stream 28 and the combustion air stream 34 through the rotor 12, as well as a direction of rotation of the rotor 12. As shown in FIGS. 2A and 2B, the flue gas stream 28 enters through the hot flue gas inlet 24 and transfers heat to the heat exchange elements 42 in the heat exchange element basket assemblies 22 mounted in the compartments 20 positioned in the flue gas sector 40. The heat exchange element basket assemblies 22, heated by the heat transferred from the flue gas stream 28 are then rotated to the air sector 38 of the air preheater 10. Heat from the heat exchange element basket assembly 22 is then transferred to the combustion air stream 34 entering through cold the air inlet 30. The flue gas stream 28, now cooled, exits the preheater 10 through the cooled flue gas outlet 26, while the combustion air stream 34, now heated, exits the preheater 10 through the air outlet 32.

Referring to the FIG. 2C, it can be seen that the rotor 12 is dimensioned to fit within an interior of the housing 14. However, an interior void 95 is formed by spaces between the rotor 12 and the housing 14. Due to a pressure differential between the hot flue gas inlet 24 and the heated air outlet 32, a portion of the combustion air stream 34 in the air sector 38 (FIG. 2B) passes over into the flue gas sector 40 (FIG. 2B) of the air preheater 10 via the interior void 95, thereby contaminating the flue gas stream 28 with air. More specifically, and as shown in FIG. 2D, a portion of the combustion air stream 34 flows from the air sector 38 to the flue gas sector 40 along a first path LG1. In addition, portions of the flue gas stream 28 bypass the rotor 12 by flowing along a second path LG2 from the hot flue gas inlet 24 directly to the cooled flue gas outlet 26 via the interior void 95, thus decreasing an efficiency of the air preheater 10. Likewise, other portions of the combustion air stream 34 bypass the rotor 12 by flowing along a third path LG3 from the cold air inlet 30 directly to the heated air outlet 32 via the interior void 95, further decreasing the efficiency of the air preheater 10.

Leakage of the combustion air stream 34 from the air sector 38 to the flue gas sector 40 along the first path LG1 (generally referred to as air leakage) causes flue gas volume in a power plant exhaust flow to increase. As a result, a pressure drop in equipment downstream from the air preheater 10 increases, thereby increasing auxiliary power consumption in components such as induced draft (ID) fans (not shown). Likewise, increased flue gas volume due to air leakage increases size and/or capacity requirements for other power plant components, such as wet flue gas desulfurization (WFGD) units (not shown) or other flue gas clean-up equipment, for example. As a result, costs associated with power plant construction, operation and maintenance are substantially increased due to air leakage.

Moreover, in a power plant equipped with a gas processing unit for carbon dioxide ($CO_2$) capture (not shown), leakage reduction is even more beneficial. For example, when designing the gas processing unit, air leakage needs to be taken into account. Oversizing the gas processing unit to accommodate the air leakage is expensive. Additionally, the gas compressors in the gas processing unit need to compress the increased gas flow due to the air leakage and this further increases auxiliary power requirements.

In light of the abovementioned problems associated with the conventional air preheater 10, steps have been taken in attempts to reduce air leakage, such as by using of a series of seals within the air preheater 10 to minimize leakage of the combustion air stream 34 from the air sector 38 to the flue gas sector 40. Referring to FIG. 3A, for example, a conventional air preheater 110 includes a rotor 112 mounted in a housing 114. The rotor 112 includes a rotor post 118 and is dimensioned to fit within an interior of the housing 114. In attempts to minimize air leakage, seals 220, 222, 224, 226, 228 and 230 are provided. The seals 220, 222, 224, 226, 228 and 230 extend from an interior surface of the housing 114 inward toward the rotor 112 and are positioned in spaces within an interior void 195 to reduce an amount of the combustion air stream 34 in the air sector 38 (FIG. 2B) from crossing into the flue gas stream 28 in the flue gas sector 40 (FIG. 2B). More specifically, as shown in FIGS. 3A and 3B, seals 222 and 224 define a plenum "A" which receives the flue gas stream 28 via a hot flue gas inlet 124. Similarly, seals 220 and 230 define a plenum "B" from which the flue gas stream 28, having passed through the rotor 112, is expelled via a cooled flue gas outlet 126. Further, seals 220 and 228 define a plenum "C" which receives the combustion air stream 34 via a cold air inlet 130, and seals 222 and 226 define a plenum "D" from which the air stream 34, having passed through the rotor 112, is expelled via a heated air outlet 132. Seals 220 and 222 also define a plenum "E", while seals 224 and 226 define a plenum "F". Seals 228 and 230, having the rotor post 118 disposed therebetween, also form a plenum "G", as shown in FIGS. 3A and 3B.

Thus, in an effort to reduce air leakage, the conventional air preheater 110 includes the seals 220, 222, 224, 226, 228 and 230. Air heater leakage is due in large part to deflection of the rotor after it has been heated from cold to hot conditions. A hot end of the rotor deflects axially more than a cold end thereof, and therefore, gaps between the seals are different, contributing to leakage, e.g., from plenums "D" and/or "C" to plenums "A" and/or "B", respectively, via plenums "F" and/or "G", respectively. Air leakage, e.g., along the first path LG1 (FIG. 3C), will now be described in further detail with reference to FIG. 3D.

FIG. 3D is a top plan view of a conventional tri-sector regenerative air preheater 310. In the tri-sector regenerative air preheater 310, seals 332, 334 and 336 are provided and divide an interior of the air preheater 310 into three plenums 360, 362 and 364. Specifically, plenum 360 is a primary air (PA) plenum 360, and generally has the highest pressure level of the three plenums 360, 362 and 364. Plenum 362 is a secondary air (SA) plenum 362 and generally has the second highest pressure level of the three plenums 360, 362 and 364, while plenum 364 is a flue gas (FG) plenum 364 and has the lowest pressure level of the three plenums 360, 362 and 364. Thus, a pressure in the PA plenum 360 is greater that pressures in both the SA plenum 362 and the FG plenum 364, while a pressure in the SA plenum 362 is greater than the pressure in the FG plenum 364 but less than the pressure in the PA plenum 360, and the pressure in the FG plenum 364 is less the pressures of both the PA plenum 360 and then SA plenum 362.

In another conventional quad-sector regenerative air preheater (not shown), seals are provided and divide an interior of the air preheater into four plenums. The PA plenum generally has the highest pressure level of the four plenums. The SA plenums having equal pressures (and generally the second highest pressure level of the four plenums while the FG plenum has the lowest pressure level of the four plenums.

In FIG. 3D, broken arrows (labeled "Flow") depict flow of gases from plenums at higher pressure into plenums at relatively lower pressures. Specifically, in the conventional tri-sector regenerative air preheater 310, air leakage occurs from both the PA plenum 360 and the SA plenum 362 into the FG plenum 364, as shown in FIG. 3D. Likewise, in the conventional quad-sector regenerative air preheater, air leakage occurs from both SA plenums and into the FG plenum. In summary, the aforementioned preheater comprises four sectors (plenums), where the flue gas flows through the largest sector, while the primary air and secondary air travel through three other smaller sectors.

Despite the use of seals, air leakage still occurs in a conventional air preheater, despite the addition of seals designed to prevent the air leakage. Accordingly, it is desirable to develop an air preheater having substantially reduced and/or effectively minimized air leakage.

SUMMARY

Disclosed herein is a heat exchanger for transferring heat between a first gas flow and a second gas flow, the heat exchanger comprising a housing having a first inlet plenum for receiving the first gas flow, a first outlet plenum for discharging the first gas flow, a second inlet plenum for receiving the second gas flow, and a second outlet plenum for discharging the second gas flow; where the first gas flow comprises a combustion air stream; and where the second gas flow comprises a reducer gas stream and an oxidizer gas stream; a rotor disposed within the housing; heat exchange elements disposed in the rotor; the heat exchanger comprising at least two sectors; a first sector that is operative to receive a combustion air stream; and a second sector that is opposed to the first sector and that is operative to receive either a reducer gas stream, an oxidizer gas stream or both the oxidizer gas stream and the reducer gas stream, and a pressurized layer disposed between the first sector and the second sector; where the pressurized layer is at a higher pressure than combustion air stream, the reducer gas stream and the oxidizer gas stream.

Disclosed herein too is method for reducing gas leakage between a first gas flow and a second gas flow passing through a heat exchanger; said method comprising providing a heat exchanger including a housing having a first inlet plenum for receiving the first gas flow, a first outlet plenum for discharging the first gas flow, a second inlet plenum for receiving the second gas flow, and a second outlet plenum for discharging the second gas flow; where the first gas flow comprises a combustion air stream; and where the second gas flow comprises a reducer gas stream and an oxidizer gas stream; a rotor disposed within the housing; heat exchange elements disposed in the rotor; the heat exchanger comprising at least two sectors; a first sector that is operative to receive a combustion air stream; and a second sector that is opposed to the first sector and that is operative to receive either a reducer gas stream, an oxidizer gas stream, or both the reducer gas stream and the oxidizer gas stream, and a pressurized layer disposed between the first sector and the second sector; where the pressurized layer is at a higher pressure than combustion air stream, the reducer gas stream and the oxidizer gas stream; heating a portion of the heat exchanger with heat derived from the reducer gas stream and/or the oxidizer gas stream; and heating the combustion air stream with the portion of the heat exchanger that derives its heat from the reducer gas stream and/or the oxidizer gas stream.

Disclosed herein too is heat exchanger for transferring heat between a first gas flow and a second gas flow, the heat exchanger comprising a housing having a first inlet plenum for receiving the first gas flow, a first outlet plenum for discharging the first gas flow, a second inlet plenum for receiving the second gas flow, and a second outlet plenum for discharging the second gas flow; where the first gas flow comprises a combustion air stream; and where the second gas flow comprises a reducer gas stream or an oxidizer gas stream; a rotor disposed within the housing; heat exchange elements disposed in the rotor; the heat exchanger comprising at least two sectors; a first sector that is operative to receive a combustion air stream; and a second sector that is opposed to the first sector and that is operative to receive a reducer gas stream, an oxidizer gas stream, or both the oxidizer gas stream and the reducer gas stream; and where the pressure of the combustion air stream is greater than the pressure of the oxidizer gas stream.

Disclosed herein too is a method for reducing gas leakage between a first gas flow and a second gas flow passing through a heat exchanger; said method comprising providing a heat exchanger including a housing having a first inlet plenum for receiving the first gas flow, a first outlet plenum for discharging the first gas flow, a second inlet plenum for receiving the second gas flow, and a second outlet plenum for discharging the second gas flow; where the first gas flow comprises a combustion air stream; and where the second gas flow comprises a reducer gas stream, an oxidizer gas stream, or both the oxidizer gas stream and the reducer gas stream; a rotor disposed within the housing; heat exchange elements disposed in the rotor; the heat exchanger comprising at least two sectors; a first sector that is operative to receive a combustion air stream; and a second sector that is opposed to the first sector and that is operative to receive a reducer gas stream, an oxidizer gas stream or both the reducer gas stream and the oxidizer gas stream, and where the pressure of the combustion air stream is greater than the pressure of the oxidizer gas stream; heating a portion of the heat exchanger with heat derived from the reducer gas stream and/or the oxidizer gas stream; and heating the combustion air stream with the portion of the heat exchanger that derives its heat from the reducer gas stream and/or the oxidizer gas stream.

Disclosed herein too are chemical looping systems that contain the heat exchangers disclosed herein.

DETAILED DESCRIPTION

Disclosed herein is a preheater that comprises two or more sectors where the air to the oxidizer (from which oxygen is obtained to oxidize the metal or the calcium sulfide) that needs to be preheated travels through the air sector, while the oxidizer exhaust gas and the reducer exhaust gas travel through the gas sectors. In one embodiment, the preheater comprises three or more sectors, specifically at least four sectors (i.e., is a quad sector preheater), where the air to be heated is transported through the largest sector, while the three smaller sectors are used to transport hot exhaust gases through them. Two of the three sectors are used to transport the hot exhaust gases from the oxidizer, while the remaining sector is used to transport hot exhaust gases from the reducer. The side of the preheater that contains sectors that transport hot exhaust gases (also termed flue gases) is termed the "gas side", while the side of the preheater that contains sectors that transport the air to the oxidizer is termed the "air side" of the preheater. The flue gas stream emanating from the oxidizer after combustion is called the oxidizer gas stream and the flue gas stream emanating from the reducer after combustion is called the reducer gas stream.

Figure 1:
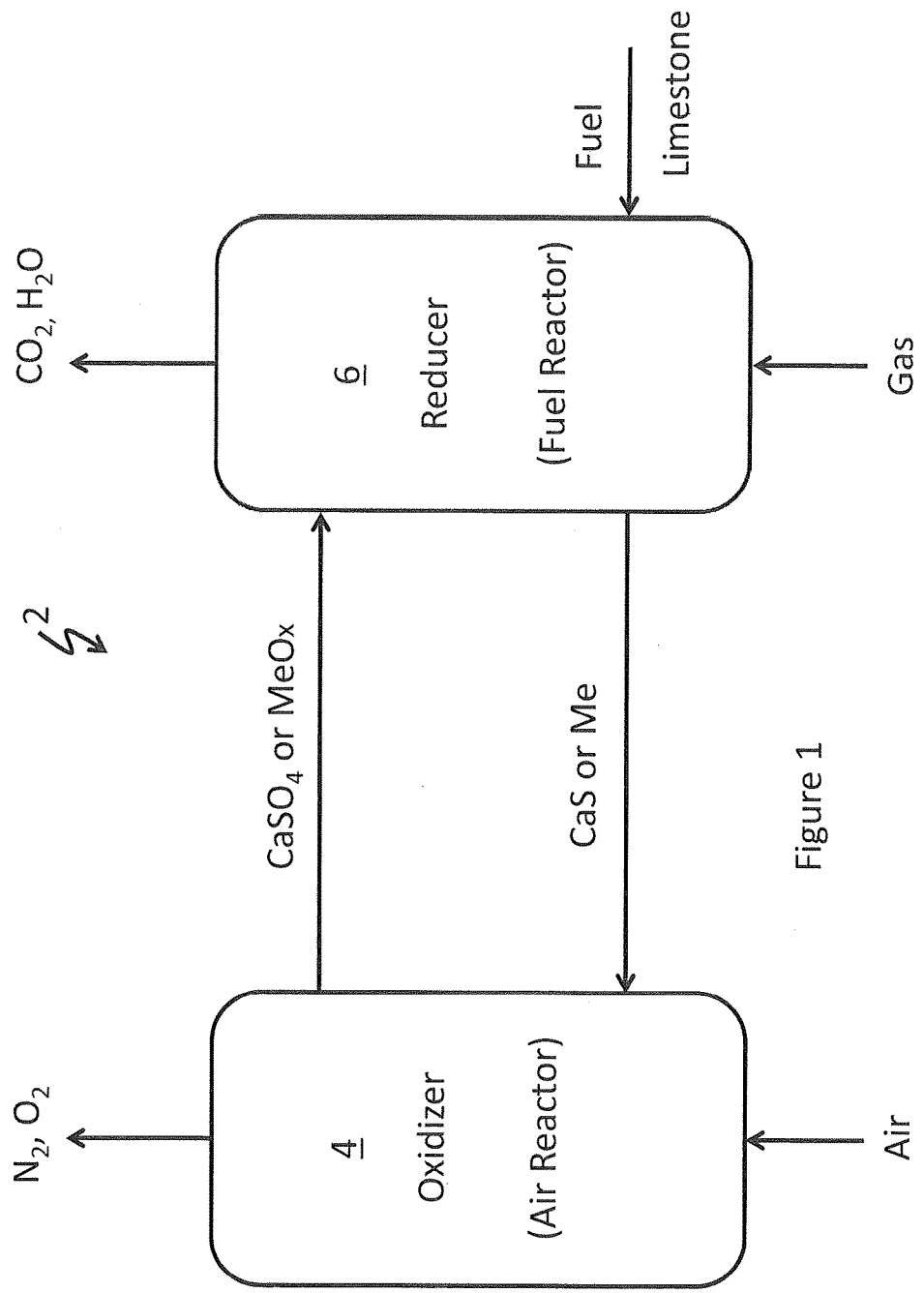
FIG. 1 depicts a chemical looping system that comprises an oxidizer and a reducer.
Figure 2A:
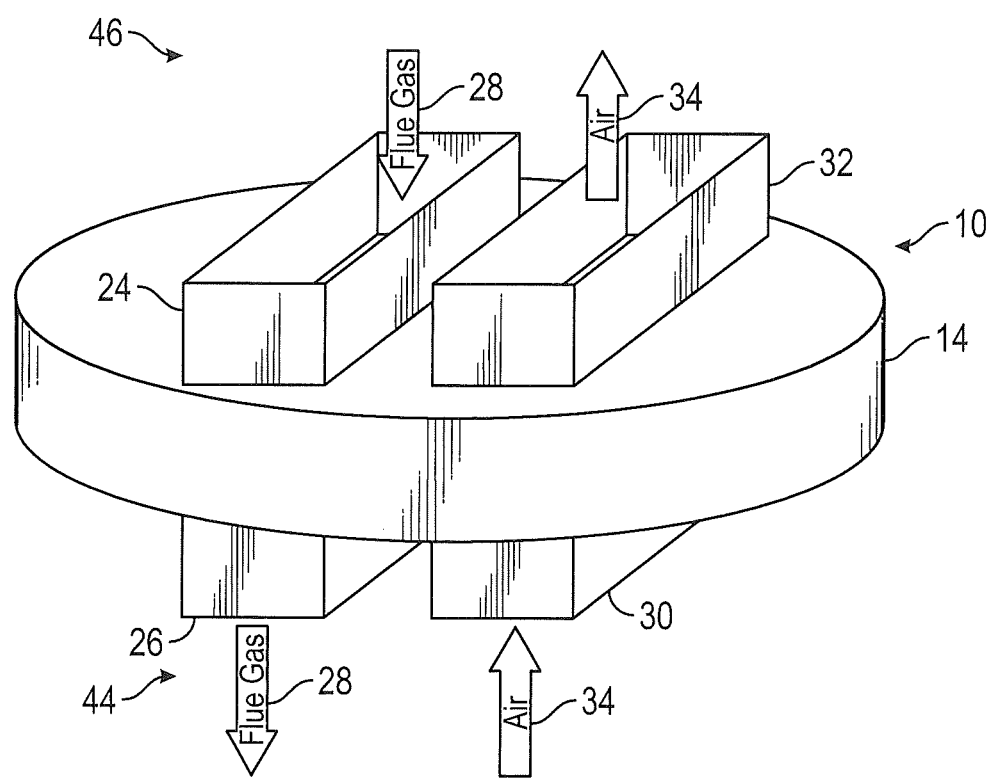
FIG. 2A depicts a conventional regenerative air preheater.
Figure 2B:
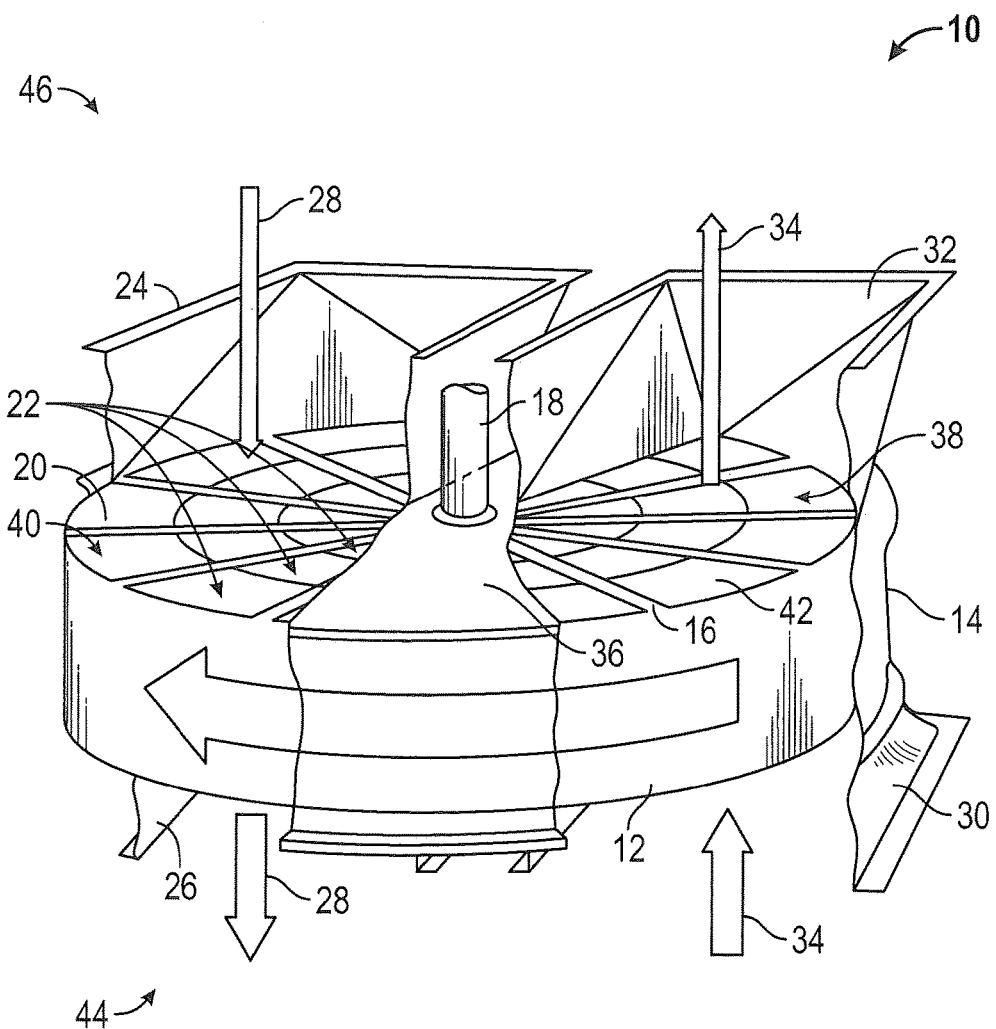
FIG. 2B depicts another view of conventional regenerative air preheater.
Figure 2C:
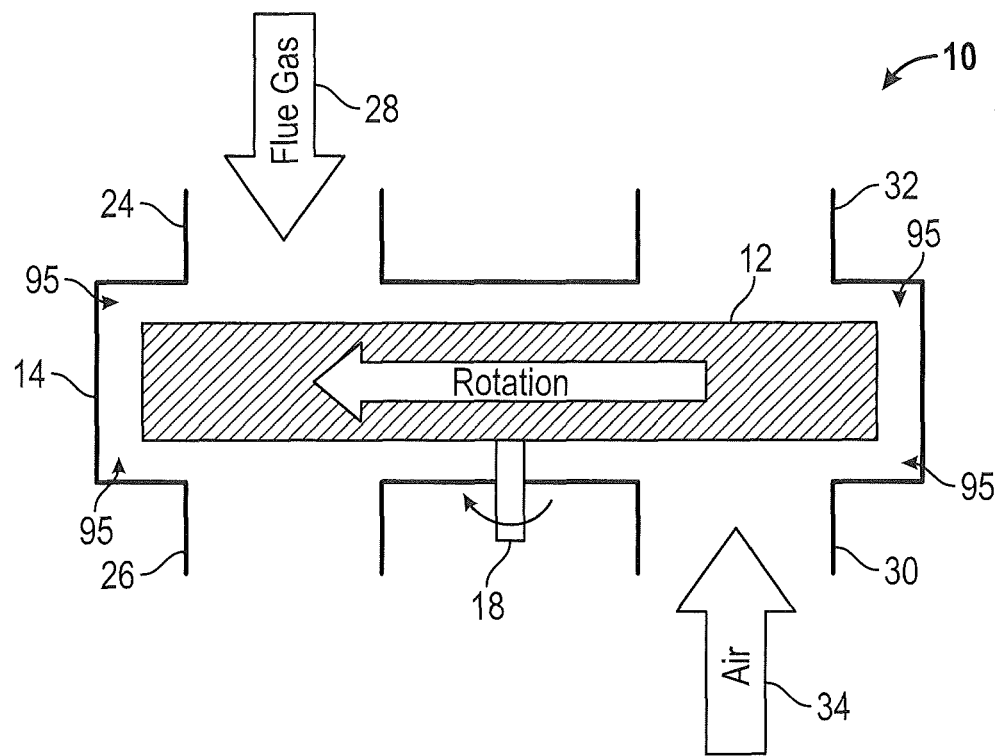
FIG. 2C depicts a rotor that is dimensioned to fit within the housing.
Figure 2D:
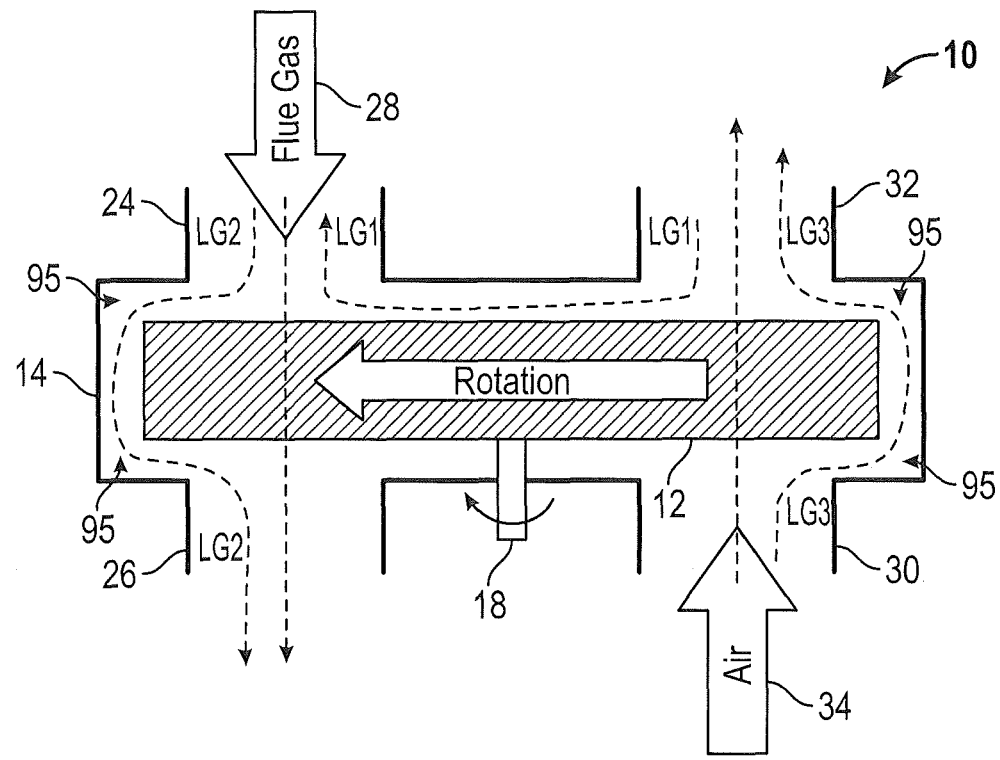
FIG. 2D depicts leakage paths in the preheater.
Figure 3A:
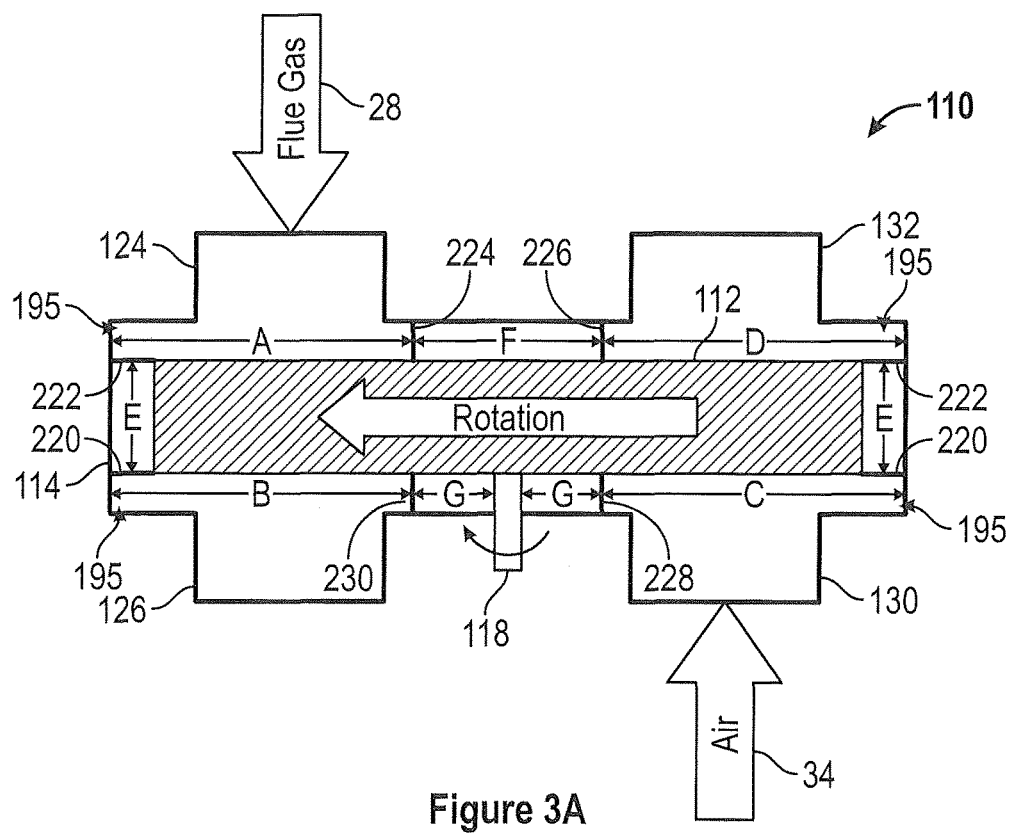
FIG. 3A depicts plenums in the air preheater formed by using seals to minimize leakage.
Figure 3B:
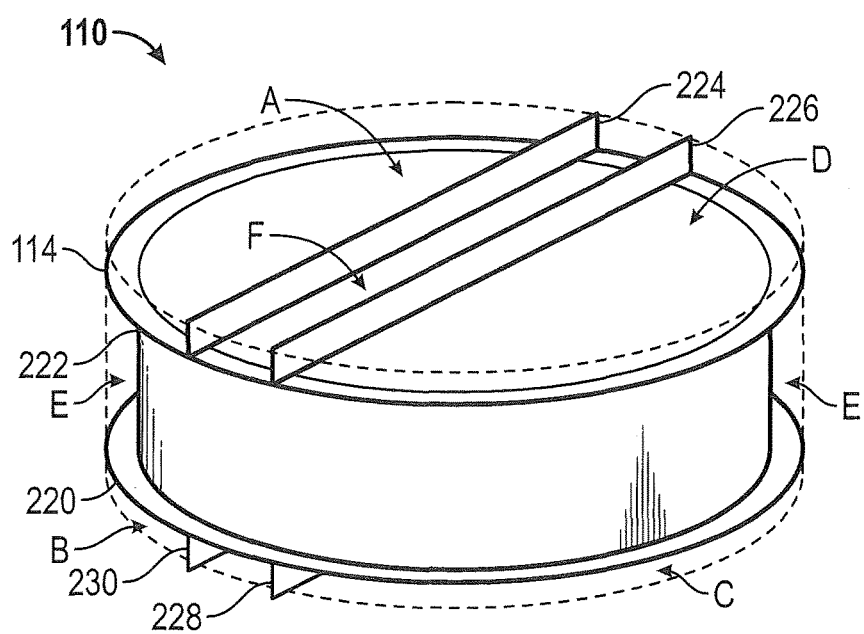
FIG. 3B is another depiction of plenums in the air preheater formed by using seals to minimize leakage.
Figure 3C:
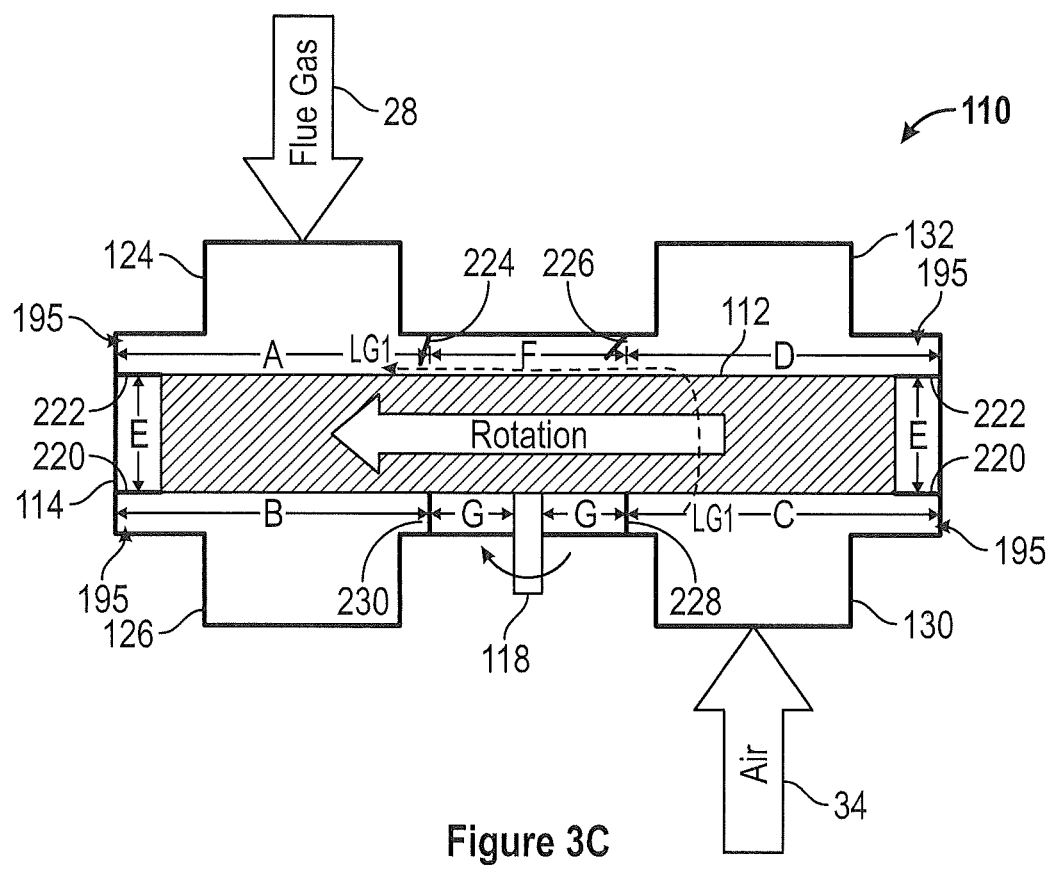
FIG. 3C depicts one manner of reducing leakage in an air preheater.
Figure 3D:
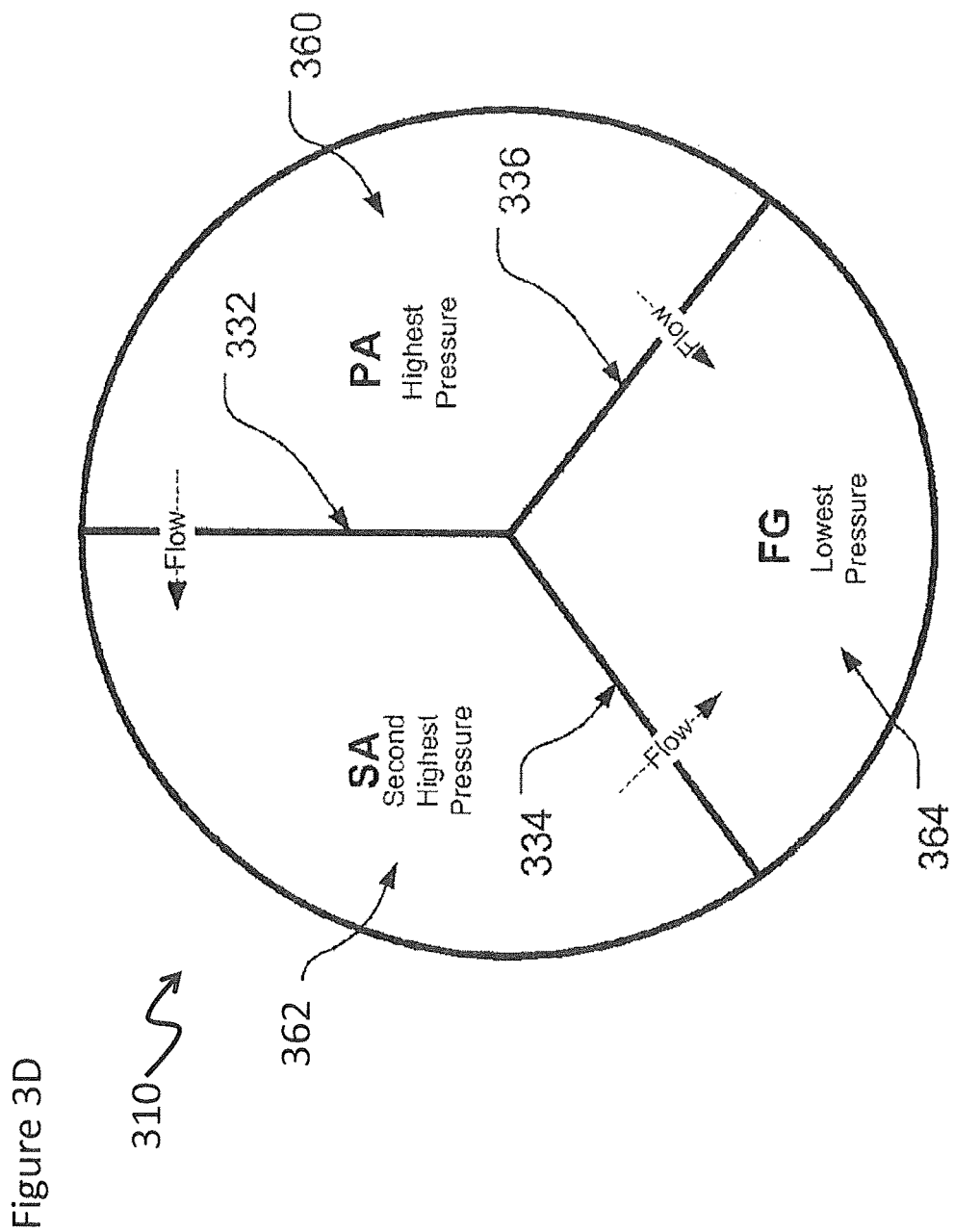
FIG. 3D depicts a conventional plenum for reducing leakage in an air preheater of the FIG. 3C.

In an embodiment, the two sectors that transport the oxidizer exhaust gases are disposed on opposite sides of the sector that transports the reducer exhaust gas. If gas pressures in these sectors are carefully designed, i.e., pressure in the reducer gas sector is no greater than pressure in the oxidizer gas sector(s), this arrangement may minimize the possibility of carbon dioxide leakage from the sector that transports reducer exhaust gases to the sector that transports the oxidizer exhaust gases. This minimizes the possibility of carbon dioxide being exhausted to the atmosphere, since the oxidizer exhaust gases comprise primarily nitrogen and oxygen (see FIG. 1). Air contamination into the oxidizer exhaust gas stream may occur as a result of this arrangement, but this does not pose a problem.

Figure 4A:
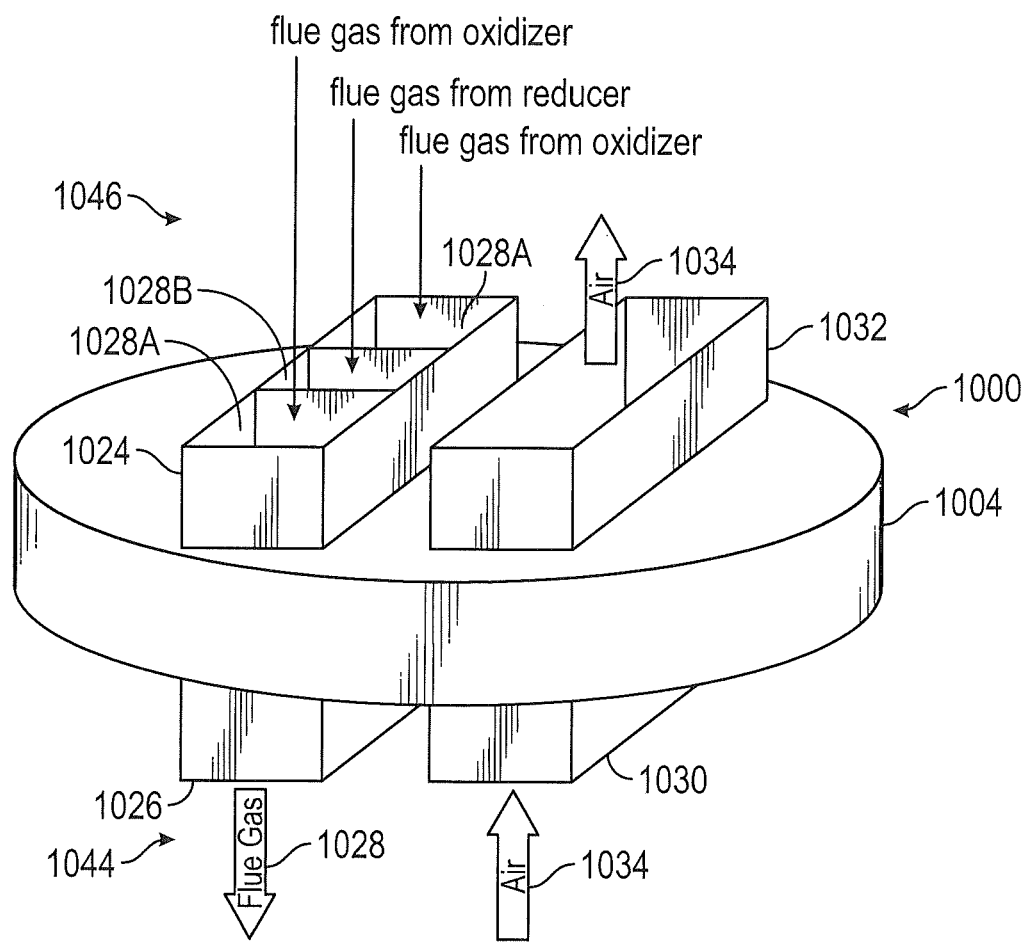
FIG. 4A depicts the disclosed regenerative air preheater.
Figure 4B:
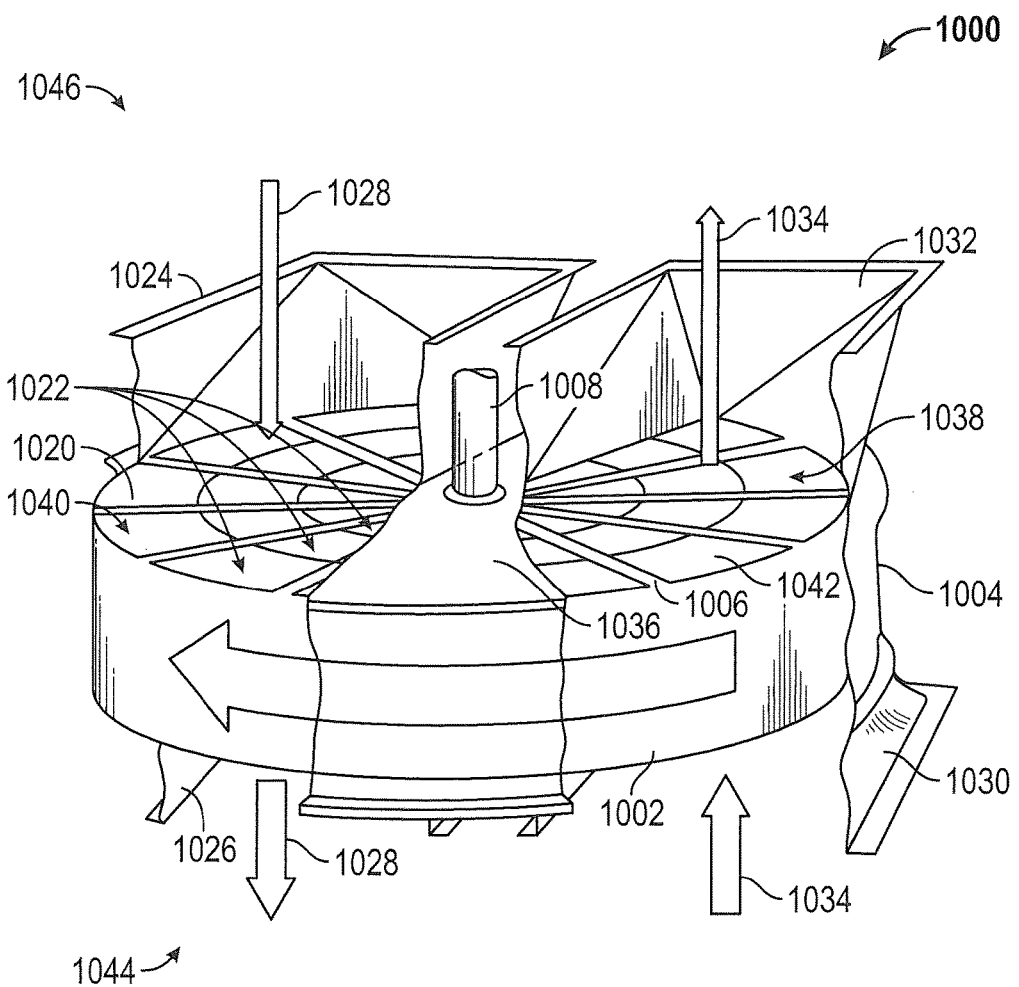
FIG. 4B depicts another view of conventional regenerative air preheater.

FIGS. 4A and 4B generally depict a rotary regenerative air preheater 1000. The air preheater 1000 has a rotor 1002 rotatably mounted in a housing 1004. The rotor 1002 includes partitions 1006 extending radially outward from a rotor post 1008 toward an outer periphery of the rotor 1002. The partitions 1006 define compartments 1020 therebetween for containing heat exchange element basket assemblies 1022. Each heat exchange basket assembly 1022 has a predetermined effective heat transfer area (typically on the order of several thousand square feet) of specially formed sheets of heat transfer surfaces, commonly referred to as heat exchange elements 1042.

In the rotary regenerative air preheater 1000, a flue gas stream 1028 (comprising exhaust from the oxidizer and the reducer, shown here as streams 1028A and 1028B respectively in the FIG. 4A) and a combustion air stream 1034 enter the rotor 1002 from respective opposite sides thereof, and pass in substantially opposite directions over the heat exchange elements 1042 housed within the heat exchange element basket assemblies 1022. More particularly, a cold air inlet 1030 and a cooled flue gas outlet 1026 are disposed at a first side of the heat exchanger (generally referred to as a cold end 1044), while a hot flue gas inlet 1024 and a heated air outlet 1032 are disposed at a second side, opposite the first side, of the air preheater 1000 (generally referred to as a hot end 1046). Sector plates 1036 extend across the housing 1004 adjacent to upper and lower faces of the rotor 1002. The sector plates 1036 divide the air preheater 1000 into an air sector 1038 and a flue gas sector 1040.

The arrows shown in FIGS. 4A and 4B indicate a direction of travel of the flue gas stream 1028 and the combustion air stream 1034 through the rotor 1002, as well as a direction of rotation of the rotor 1002. As shown in FIGS. 4A and 4B, the flue gas streams 1028A (from the oxidizer—also know herein as the oxidizer gas stream) and 1028B (from the reducer—also known herein as the reducer gas stream) enters through the hot flue gas inlet 1024 and transfers heat to the heat exchange elements 1042 in the heat exchange element basket assemblies 1022 mounted in the compartments 1020 positioned in the flue gas sector 1040. The heat exchange element basket assemblies 1022, heated by the heat transferred from the flue gas stream 1028 are then rotated to the air sector 1038 of the air preheater 1000. Heat from the heat exchange element basket assembly 1022 is then transferred to the combustion air stream 1034 entering through cold the air inlet 1030. The flue gas stream 1028, now cooled, exits the preheater 1000 through the cooled flue gas outlet 1026, while the combustion air stream 1034, now heated, exits the preheater 1000 through the air outlet 1032.

As previously detailed, intermixing between the exhaust gases (emanating from the oxidizer and the reducer) and the air (used to oxidize the metals and/or calcium sulfide) in the oxidizer can occur in the preheater. Seals disposed between the respective sectors can be used to minimize intermixing.

Figure 5:
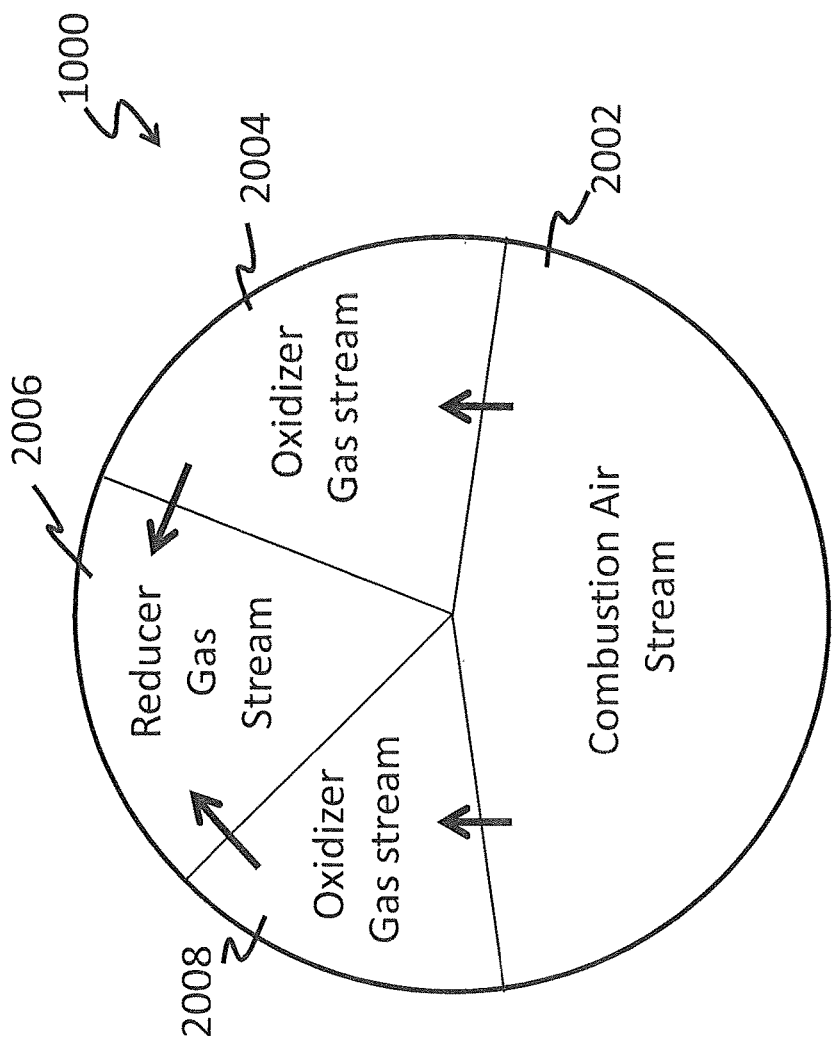
FIG. 5 depicts one embodiment of a an air preheater that comprises 4 sectors for transferring heat from the gas side to the air side of the air preheater.

The FIG. 5 depicts a top view of the preheater 1000 divided into four sectors. The FIG. 5 (in conjunction with the FIGS. 4A and 4B) depicts an embodiment where the preheater 1000 is divided into four sectors, a first sector 2002 for transporting air (i.e., the combustion air stream 1034) to the oxidizer via the preheater 1000, a second sector 2004 and a fourth sector 2008 for transporting exhaust gases from the oxidizer (hereinafter oxidizer gas stream) and a third sector 2006 for transporting exhaust gases from the reducer (hereinafter reducer gas stream). The fourth sector 2006, which transports the reducer gas stream 1028B, lies between the two sectors 2004 and 2008, which transport the oxidizer gas stream 1028A. The arrows in the FIG. 5 (depicted by bolded lines) depict the direction of leakage that is caused by pressure differentials and that occurs between the sectors 2002, 2004, 2006 and 2008. The pressure in the respective sectors is selected so that any leakage occurs from the first sector 2002 towards the second and fourth sectors 2004 and 2008 respectively. The leakage from the second and the fourth sectors 2004 and 2008 occurs towards the sector 2006.

The combustion air stream 1034 (See FIG. 4A) enters the first sector 2002 of the preheater 1000. The pressure $P_1$ of the combustion air stream 1034 in the sector 2002 is higher than the pressure $P_2$ of the oxidizer gas stream 1028A in the sectors 2004 and 2008. The pressure $P_1$ is also higher than the pressure $P_3$ of the reducer gas stream 1028B in the sector 2006. The pressure $P_3$ of the reducer gas stream 1028B in the sector 2006 is no greater than the pressure $P_2$ of the oxidizer gas stream 1028A in the sectors 2004 and 2008. In other words, the pressure $P_1$ is greater than pressure $P_2$, which is in turn no less than pressure $P_3$. In one embodiment, $P_2$ can be greater than or equal to about $P_3$.

The use of a combustion air stream pressure that is higher than the pressure of the flue gas streams (i.e., the pressure of the oxidizer gas stream or the reducer gas stream) prevents carbon dioxide present in the reducer stream from contaminating the combustion air stream. Leakage from the combustion air stream to the oxidizer gas stream and to the reducer gas stream is minimized. The contamination of the oxidizer gas stream 1028A and the reducer gas stream 1028B with air from the combustion air stream 1034 does not cause damage to the chemical looping system or to the exhaust streams emanating from the preheater. By choosing $P_2$ to be greater than or equal to $P_3$, any pressure differential driven leakage that occurs between sectors is in the direction from the oxidizer gas stream 1028A towards the reducer gas stream 1028B.

As has already been previously detailed, upon heating of the respective basket assemblies 1022 by the oxidizer gas stream 1028A and by the reducer gas stream 1028B, the baskets are then rotated to the air sector 1038 of the air preheater 1000. Heat from the heat exchange element basket assembly 1022 is then transferred to the combustion air stream 1034 entering through the cold air inlet 1030, which causes the combustion air stream 1034 to be preheated prior to entering the oxidizer (not shown).

In one embodiment (not shown), the reducer gas stream 1028B may be transported through a flow resistance (or throttling) device which adjusts the pressure of the reducer gas stream to be always less than the pressure of the oxidizer gas stream during operation. A damper, controlled with pressure differential signal between the oxidizer and reducer gas stream, is an example of such a flow throttling device.

Figure 6:
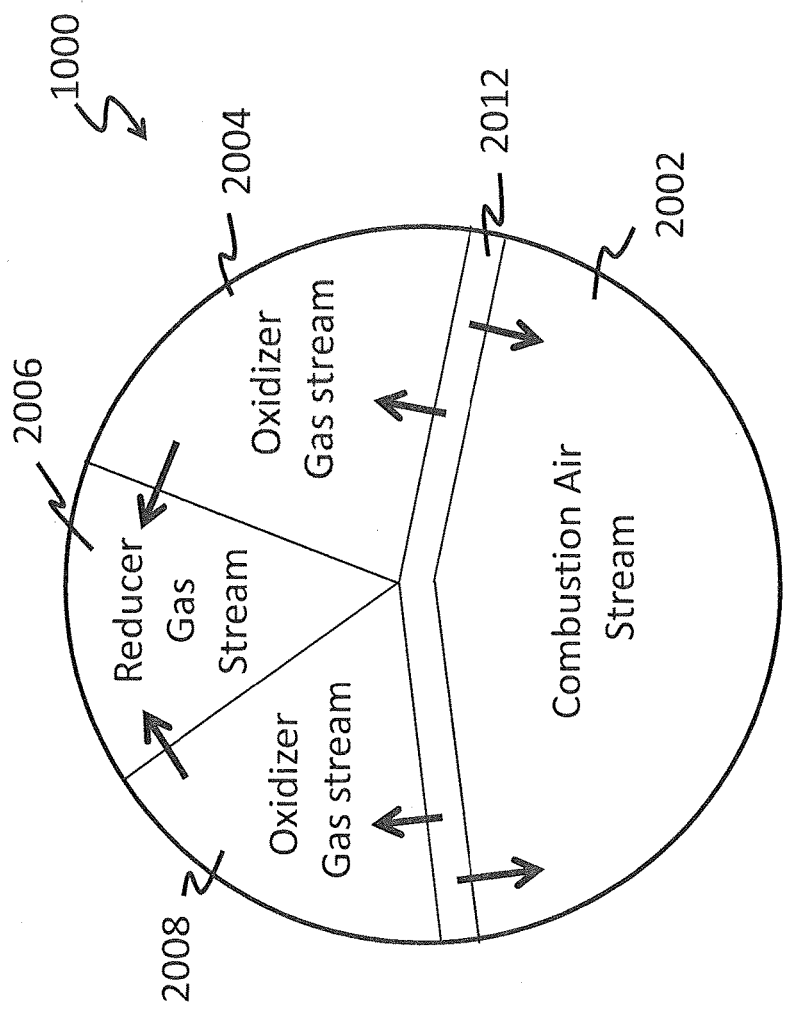
FIG. 6 depicts one embodiment of a pressurized layer in an air preheater that reduces leakage from the air side to the gas side of the air preheater.

In one embodiment as depicted in the FIG. 6, the preheater 1000 may comprise a pressurized layer 2012 disposed between the sector 2002 and the sectors 2004, 2006 and 2008. In an embodiment, the oxidizer gas stream 1028A from either the inlet side (1028A) or the outlet side (not shown) of the air preheater, may be pressurized and discharged into the pressurized layer 2012 at a pressure $P_4$ that is greater than the pressure $P_1$ used in the first sector 2002. Pressure differential driven leakage between the sectors is depicted in the FIG. 6 by solid arrows. By using a pressure $P_4$ that is greater than the pressure $P_1$, the oxidizer gas stream leaks into the sector 2002 (through which the combustion air stream is transported) from the pressurized layer 2012. The oxidizer gas stream also leaks from the pressurized layer 2012 into the sectors 2004 and 2008 through which the oxidizer gas stream is transported. Leakage also occurs from the sectors 2004 and 2008 into the sector 2006 through which the reducer gas stream is transported. The use of a pressurized layer disposed between a sector that transports the combustion air stream and sectors that transports the oxidizer gas stream and the reducer gas stream prevents the combustion air stream from leaking into oxidizer gas stream or into the reducer gas stream.

Figure 7:
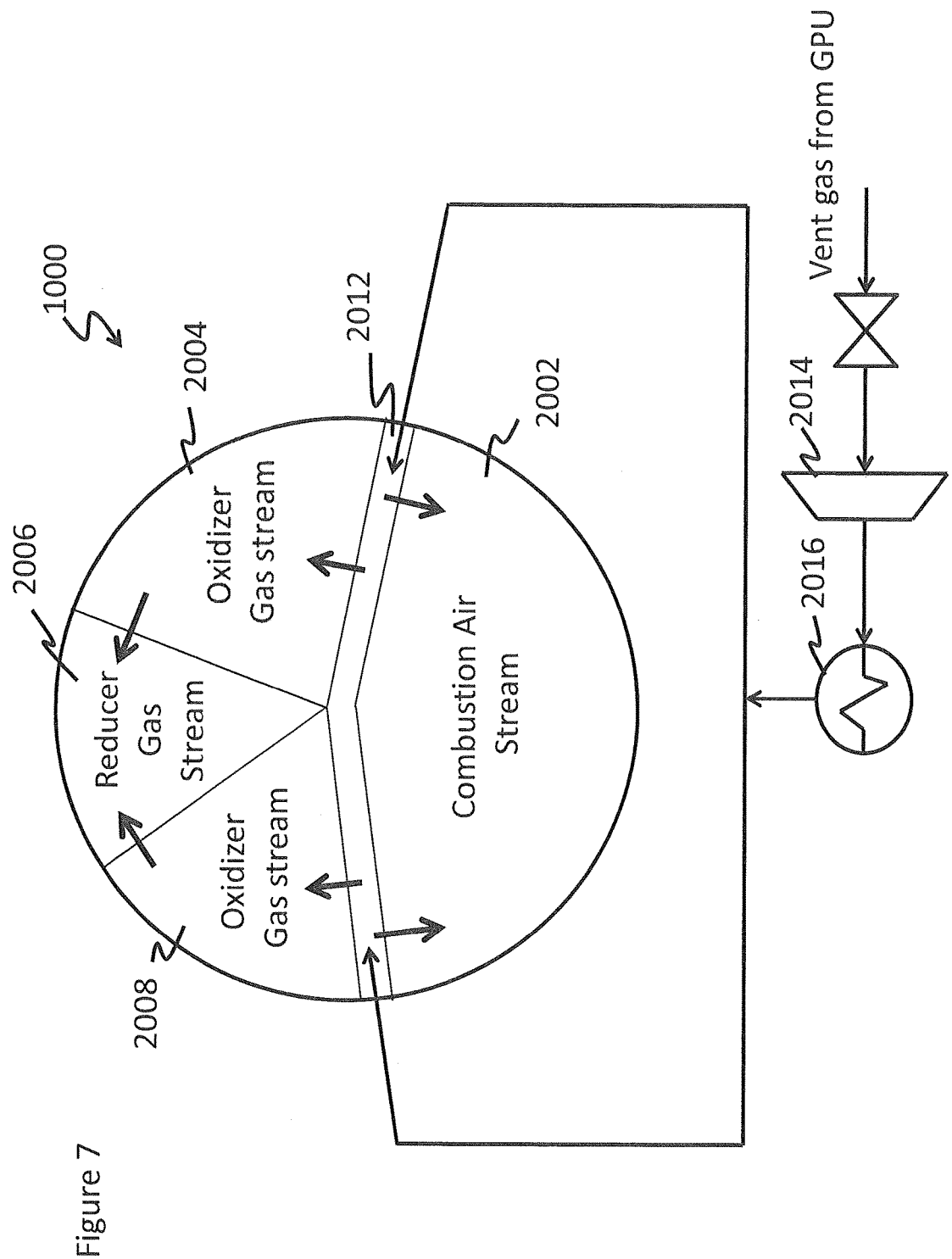
FIG. 7 depicts another embodiment of a pressurized layer in an air preheater that reduces leakage from the air side to the gas side of the air preheater.
Figure 8:
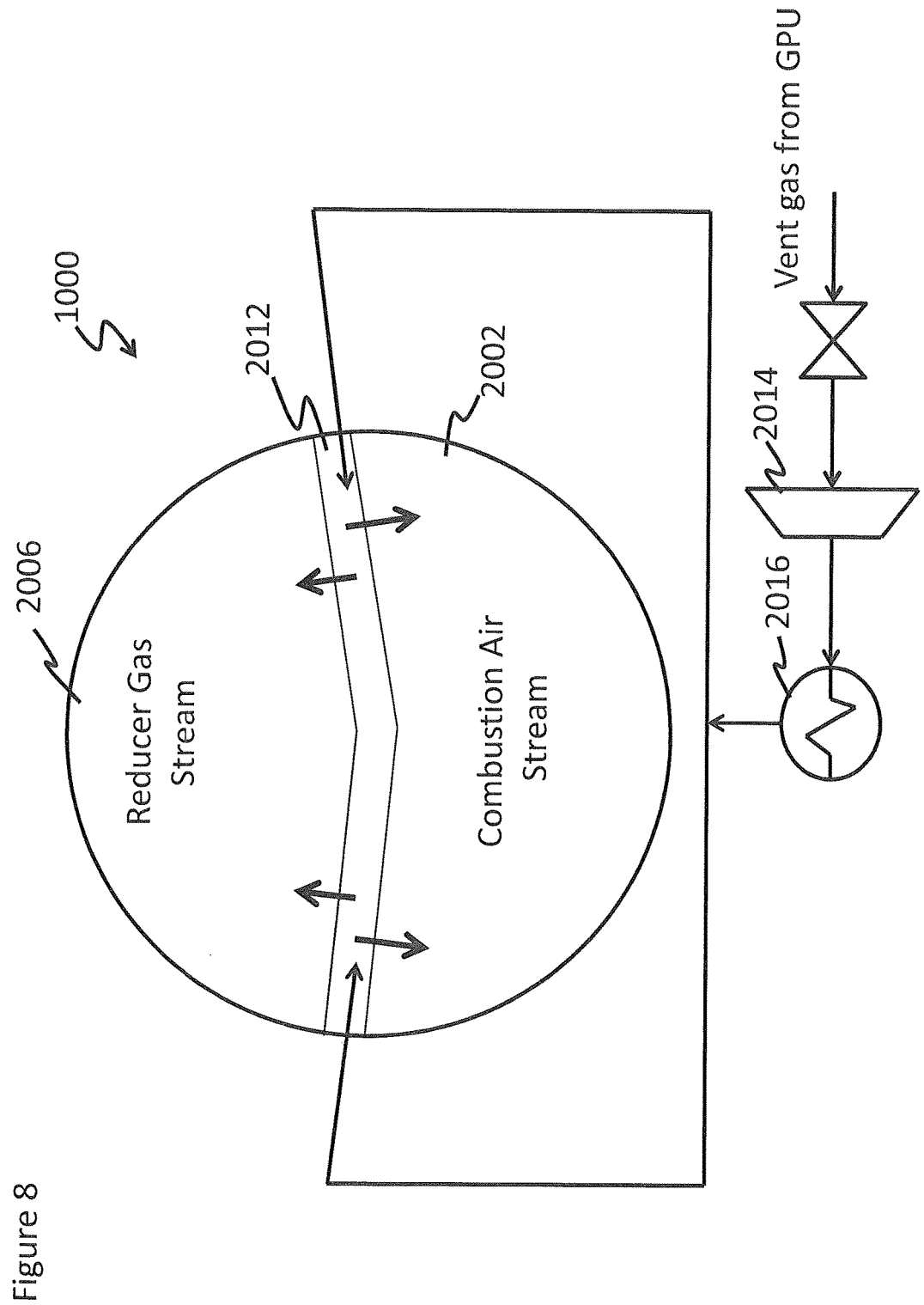
FIG. 8 depicts one embodiment of a pressurized layer in an air preheater that reduces leakage from the air side to the gas side of the air preheater.

In one embodiment, the vent gas from a gas processing unit (GPU) may be used to supply the pressurized layer. A gas processing units functions to purify the reducer gas and compress the purified carbon dioxide to the pressure according to the product quality requirement. A small amount of un-purified gas, containing carbon dioxide and other emissions allowed by the air emission standard, is vented to the atmosphere. This gas is called vent gas. The FIGS. 7 and 8 depict embodiments where all or a portion of the vent gas from the gas processing unit (not shown) is transported to the pressurized layer 2012 to prevent leakage from the air side of the air preheater to the gas side of the preheater. The FIG. 7 depicts an air preheater 1000 similar to that in the FIG. 6, with the exception that vent gas from the gas processing unit is directed to an optional booster fan 2014 and an optional heater 2016 to heat the vent gas prior to transporting it to the pressurized layer 2012 of the airpreheater. The air preheater of the FIG. 7 has 4 sectors whose functions are previously described with regard to the FIG. 6 and will not be repeated once again.

Vent gas is the permitted emission from the power plant. Although the vent gas used to pressurize the pressurized layer 2012 is eventually emitted to atmosphere through the combustion air stream and then the reducer gas stream, this does not increase the total emission from the power plant.

The FIG. 8 depicts a two sector air preheater 1000 comprising sector 2002 (that transports the combustion air stream) being opposedly disposed to the sector 2006 (that transports the reducer gas stream). A pressurized layer 2012 that is pressurized by vent gas from the GPU is disposed between the sector 2002 and the sector 2006. The vent gas in the pressurized layer 2012 is at a higher pressure than the combustion air stream pressure or the reducer gas stream pressure and hence prevents leakage from the air sector 2002 to the reducer gas stream sector 2006. Pressure differential driven leakage occurs from the pressurized layer 2012 into the sector 2002 and into the sector 2006 as indicated by the bolded arrows seen in the FIG. 8. In the FIG. 8, the vent gas from the gas processing unit is directed to an optional booster fan 2014 and an optional heater 2016 to heat the vent gas prior to transporting it to the pressurized layer 2012 of the air-preheater.

Figure 9:
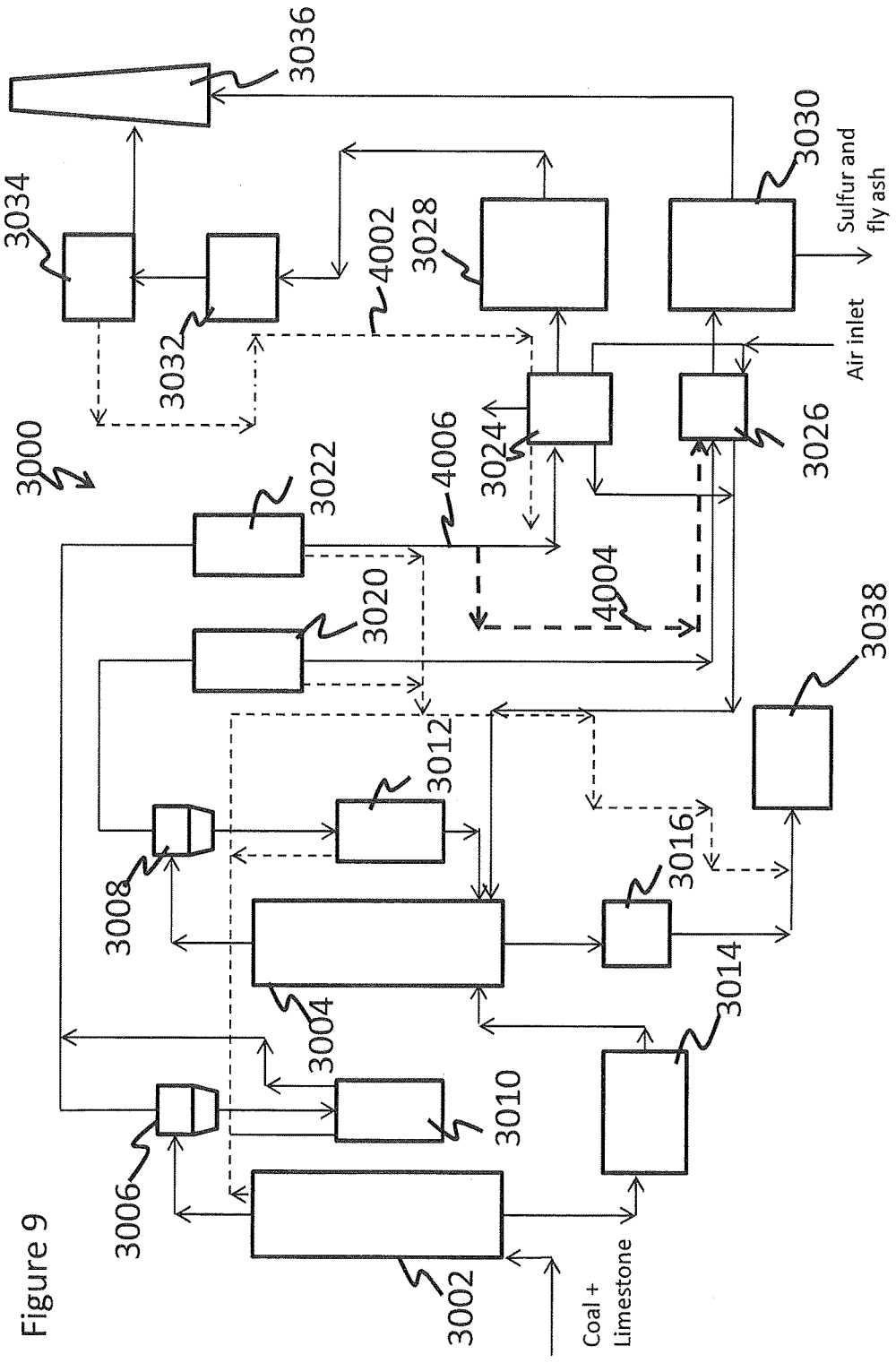
FIG. 9 depicts a chemical looping power plant that includes the air preheaters detailed herein.

In one embodiment, in one manner of using the air preheaters 1000 detailed above, a system can comprise one or more of the air preheaters detailed above. In an embodiment, the system can employ one or more preheaters, and specifically two or more preheaters. The FIG. 9 depicts a system that comprises two preheaters to preheat air that is supplied to an oxidizer to support combustion. In the FIG. 9, the system 3000 comprises a reducer 3002 in fluid communication with an oxidizer 3004. Calcium sulfide is oxidized in the oxidizer 3004 to form calcium sulfate, which is then transported to the reducer 3002, where it is reduced back to calcium sulfide. Calcium sulfide from the reducer 3002 is charged to the oxidizer 3004 via the reducer bottom outlet 3014. Transportation facilities for transporting the calcium sulfide and calcium sulfate back and forth between the reducer 3002 and oxidizer 3004 are present, but are not shown in detail in the FIG. 9. Coal is charged to the reducer 3002 where it is combusted with oxygen that is released from the calcium sulfate.

Flue gases from the reducer 3002 and the oxidizer 3004 are discharged separately to the particle separators 3006 and 3008 respectively, from which any separated particles are recharged back to the respective reactors (i.e., the reducer or the oxidizer). The gases from the separators 3006 (mainly carbon dioxide) and 3008 (mainly nitrogen) are discharged to respective backpass heat exchangers 3022 and 3020 respectively. In the heat exchangers 3020 and 3022, steam is generated, which is used in a steam cycle 3038. The respective flue gases are then discharged to the air preheaters 3024 and 3026 where they are used to heat air that is then charged to the oxidizer 3004. After sulfur and other particles are removed from the respective flue gases in sulfur and particulate removal systems 3028 and 3030 respectively, they are discharged to a stack 3036 for discharge to the atmosphere. The carbon dioxide flue gas from the oxidizer is subjected to two additional steps prior to being discharged from the stack 3036. The carbon dioxide from the air heater 3028 is discharged to a flue gas condenser 3032 and then to a gas processing unit 3034, prior to being discharged to the stack 3036. While not shown here, the flue gas from the oxidizer and/or the reducer may both be split into two streams each that can each be fed to the air preheaters 3024 and 3026.

In an embodiment, the air preheaters 3024 and 3026 can both be two sector air preheaters (See FIG. 8) or can both be four sector preheaters (See FIG. 7). In one embodiment, one of the air-preheaters can be a two sector air preheater, while one of the air preheaters can be a four sector air preheater. In an exemplary embodiment, both of the air preheaters are two sector air preheaters.

With reference now again to the FIG. 9, when both preheaters 3024 and 3026 are two sector preheaters (See FIG. 8), air is charged to the sector both via the air inlet. In the preheater 3024, a reducer gas stream is charged to the gas side of the air preheater, while a vent gas from the GPU is charged to the pressurized layer via the line 4002. In the preheater 3026, an oxidizer gas stream is charged to the gas side of the air preheater. The vent gas prevents leakage from the air side of the preheater to the gas side of the preheater. In this manner, two two-sector air preheaters can be used in a chemical looping system to preheat air using flue gases from the reducer or oxidizer.

With reference once again to the FIG. 9, it is possible to use the two preheaters 3024 and 3026 in such a manner that one preheater has two sectors, while the other preheater has three sectors. In this embodiment, the reducer gas stream emanating from the heat exchanger 3022 is split into two streams 4004 and 4006. One stream 4006 is charged to the air preheater 3024, which is a two sector air preheater. The other stream 4004 is charged to the other preheater 3026. The preheater 3026 is a four sector preheater (see FIG. 7), where the oxidizer gas stream is charged to two sectors 2004 and 2008, while the reducer gas stream 4004 is charged to sector 2006. The air that is to be heated is charged to both the air preheaters 3024 and 3026 as shown in the FIG. 9. The combustion air stream is charged to the air side of the respective air preheaters, while the reducer gas stream and the oxidizer gas stream are charged to the sectors that are opposed to those on the air side (i.e., they are charged to the gas side) of the gas preheater. A vent gas from the GPU is charged to the pressurized layer via the line 4002. The vent gas prevents leakage from the air side of the preheater to the gas side of the preheater. Thus as shown, a two sector preheater may be used in conjunction with a four sector preheater to heat air for the oxidizer.

The use of the air preheaters as detailed here has many advantages. Leakage from the gas side to the air side of the preheater may be minimized. Carbon dioxide leakage from the reducer gas stream to the oxidizer gas stream and combustion air stream may also be minimized. Similarly leakage from the air side to the gas side of the preheater may also be minimized.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, singular forms like "a," or "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term and/or is used herein to mean both "and" as well as "or". For example, "A and/or B" is construed to mean A, B or A and B. The transition term "comprising" is inclusive of the transition terms "consisting essentially of" and "consisting of" and can be interchanged for "comprising".

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heat exchanger for transferring heat between a first gas flow and a second gas flow, the heat exchanger comprising:
    a housing having a first inlet plenum for receiving the first gas flow, a first outlet plenum for discharging the first gas flow, a second inlet plenum for receiving the second gas flow, and a second outlet plenum for discharging the second gas flow; where the first gas flow comprises a combustion air stream; and where the second gas flow comprises a reducer gas stream output from a reducer of a chemical looping system and an oxidizer gas stream output from an oxidizer of the chemical looping system and containing primarily nitrogen;
    a rotor disposed within the housing;
    heat exchange elements disposed in the rotor;
    the heat exchanger comprising at least three sectors; a first sector that is operative to receive a combustion air stream; a second sector that is opposed to the first sector and that is operative to receive the oxidizer gas stream and a third sector that is operative to receive the reducer gas stream, the first sector, the second sector and the third sector being divided from one another by sector plates that extend across the housing; and a pressurized layer disposed between the first sector and both of the second sector and the third sector and separating the first sector from both of the second sector and the third sector; where the pressurized layer is at a higher pressure than the combustion air stream, the reducer gas stream and the oxidizer gas stream so that the combustion air stream is prevented from leaking into either the oxidizer gas stream or the reducer gas stream;

wherein a pressure of the combustion air stream in the first sector is greater than a pressure of the oxidizer gas stream in the second sector, and the pressure of the oxidizer gas stream in the second sector is greater than a pressure of the reducer gas stream in the third sector so that any pressure differential driven leakage that occurs between sectors is in a direction from the oxidizer gas stream towards the reducer gas stream.

2. The heat exchanger of claim 1, where the pressurized layer is operative to receive either vent gas from a gas processing unit, an oxidizer gas stream from an oxidizer unit or both the vent gas and the oxidizer gas stream.

3. The heat exchanger of claim 1, wherein the rotor rotates about a rotor post.

4. The heat exchanger of claim 1, wherein the heat exchanger is a regenerative air preheater.

5. The heat exchanger of claim 1, wherein the heat exchanger includes a fourth sector that is operative to receive a portion of the oxidizer gas stream; and wherein the pressurized layer is disposed between the first sector and the second sector, the third sector and the fourth sector.

6. The heat exchanger of claim 5, wherein the third sector that is operative to receive the reducer gas stream lies between the second sector and the fourth sector that are operative to receive the oxidizer gas stream.

7. The heat exchanger of claim 1, wherein the pressurized layer comprises a pressurized oxidizer gas stream that is at a higher pressure than the oxidizer gas stream that is received in the second sector.

8. A method for reducing gas leakage between a first gas flow and a second gas flow passing through a heat exchanger; said method comprising:

providing a heat exchanger including:

a housing having a first inlet plenum for receiving the first gas flow, a first outlet plenum for discharging the first gas flow, a second inlet plenum for receiving the second gas flow, and a second outlet plenum for discharging the second gas flow; where the first gas flow comprises a combustion air stream; and where the second gas flow comprises a reducer gas stream output from a reducer of a chemical looping system and an oxidizer gas stream output from an oxidizer of the chemical looping system and containing primarily nitrogen;

a rotor disposed within the housing;

heat exchange elements disposed in the rotor; the heat exchanger comprising at least two sectors; a first sector that is operative to receive the combustion air stream; and a second sector that is opposed to the first sector and that is operative to receive either the reducer gas stream, the oxidizer gas stream or both the reducer gas stream and the oxidizer gas stream, the first sector and the second being separated from one another by at least one sector plate that extends across the housing, and a pressurized layer disposed between the first sector and both the second sector; where the pressurized layer is at a higher pressure than the combustion air stream, the reducer gas stream and the oxidizer gas stream;

heating a portion of the heat exchanger with heat derived from the reducer gas stream and/ or the oxidizer gas stream; and heating the combustion air stream with the portion of the heat exchanger that derives its heat from the reducer gas stream and/ or the oxidizer gas stream;

wherein the pressurized layer is formed by pressurizing a portion of the oxidizer gas stream and discharging the pressurized portion of the oxidizer gas stream into the pressurized layer.

9. The method of claim 8, further comprising rotating the heat exchange elements about a rotor post.

10. The heat exchanger of claim 2, wherein the vent gas, oxidizer gas stream or the vent gas and oxidizer gas stream is heated with a heater prior to being received by the pressurize layer.

11. The method of claim 8, further comprising the step of heating the pressurized portion of the oxidizer gas stream before discharge to the pressurized layer.

12. A heat exchanger for transferring heat between a first gas flow and a second gas flow, the heat exchanger comprising:

a housing having a first inlet plenum for receiving the first gas flow, a first outlet plenum for discharging the first gas flow, a second inlet plenum for receiving the second gas flow, and a second outlet plenum for discharging the second gas flow; where the first gas flow comprises a combustion air stream; and where the second gas flow comprises a reducer gas stream output from a reducer of a chemical looping system and an oxidizer gas stream output from an oxidizer of the chemical looping system and containing primarily nitrogen;

a rotor disposed within the housing;

heat exchange elements disposed in the rotor;

the heat exchanger comprising at least four sectors; a first sector that is operative to receive a combustion air stream; a second sector that is opposed to the first sector and that is operative to receive a first portion of the oxidizer gas stream, a third sector that is operative to receive the reducer gas stream, and a fourth sector that is opposed to the first sector and that is operative to receive a second portion of the oxidizer gas stream, the first sector, the second sector, the third sector and the fourth sector being divided from one another by sector plates that extend across the housing; and a pressurized layer disposed between the first sector and each of the second sector, the third sector and the fourth sector and separating the first sector from each of the second sector, the third sector and the fourth sector; where the pressurized layer is at a higher pressure than the combustion air stream, the reducer gas stream and both the first portion and the second portion oxidizer gas stream so that the combustion air stream is prevented from leaking into either the first portion and the second portion of the oxidizer gas stream or the reducer gas stream;

wherein the third sector that is operative to receive the reducer gas stream lies between the second sector and the fourth sector that are operative to receive the first portion and the second portion of the oxidizer gas stream; and wherein a pressure of the combustion air stream in the first sector is greater than a pressure of the first portion of the oxidizer gas stream in the second sector and a pressure of the second potion of the oxidizer gas stream in the fourth sector, and the pressure of the first portion of the oxidizer gas stream in the second sector and the pressure of the second potion of the oxidizer gas stream in the fourth sector are greater than a pressure of the reducer gas stream in the second sector so that any pressure differential driven leakage that occurs between sectors is in a direction from the first and second portion of the oxidizer gas stream towards the reducer gas stream.

13. The heat exchanger of claim 12, further comprising:
a flow resistance device configured to selectively adjust the pressure of the reducer gas stream in the third sector to ensure that the pressure of the reducer gas stream is lower than the pressure of both the first portion of the oxidizer gas stream and the second portion of the oxidizer gas stream.

14. The heat exchanger of claim 13, further comprising:
a booster fan upstream from an inlet to the pressurized layer, the booster fan being configured to ensure that the pressurized layer is at a higher pressure than the combustion air stream, the reducer gas stream and both the first portion and the second portion of the oxidizer gas stream.

15. The heat exchanger of claim 1, further comprising:
a flow resistance device configured to selectively adjust the pressure of the reducer gas stream in the third sector to ensure that the pressure of the reducer gas stream is lower than the pressure of the oxidizer gas stream.

16. The heat exchanger of claim 15, further comprising:
a booster fan upstream from an inlet to the pressurized layer, the booster fan being configured to ensure that the pressurized layer is at a higher pressure than the combustion air stream, the reducer gas stream and the oxidizer gas stream.

* * * * *